(12) United States Patent
Hawthorne (10) Patent No.: US 11,365,155 B1
(45) Date of Patent: Jun. 21, 2022

(54) MOLDABLE SILICON NITRIDE GREEN-BODY COMPOSITE AND REDUCED DENSITY SILICON NITRIDE CERAMIC PROCESS

(71) Applicant: ATC Materials Inc, Westlake, OH (US)

(72) Inventor: Mark Hawthorne, Flagstaff, AZ (US)

(73) Assignee: ATC Materials Inc, Westlake, OH (US)

( * ) Notice: Subject to any disclaimer, the term of this patent is extended or adjusted under 35 U.S.C. 154(b) by 0 days.

(21) Appl. No.: 17/222,850

(22) Filed: Apr. 5, 2021

Related U.S. Application Data (63) Continuation-in-part of application No. 16/039,313, filed on Jul. 18, 2018, now Pat. No. 10,968,139.

(Continued)

(51) Int. Cl.
*C04B 35/584* (2006.01)
*C04B 35/634* (2006.01)
(Continued)

(52) U.S. Cl.
CPC ........ *C04B 35/584* (2013.01); *C04B 35/6261* (2013.01); *C04B 35/6264* (2013.01); *C04B 35/63448* (2013.01); *C04B 35/645* (2013.01); *C04B 2235/402* (2013.01); *C04B 2235/428* (2013.01); *C04B 2235/602* (2013.01); *C04B 2235/608* (2013.01); *C04B 2235/612* (2013.01);
(Continued)

(58) Field of Classification Search
None
See application file for complete search history.

(56) References Cited

U.S. PATENT DOCUMENTS

| | | | |
|---|---|---|---|
| 3,624,022 A | 11/1971 | Ross et al. | |
| 4,579,699 A * | 4/1986 | Verzemnieks | .......... C04B 38/06 264/43 |

(Continued)

OTHER PUBLICATIONS

"Surfactant." Wikipedia,Jul. 15, 2017,web.archive.org/web/20170715212357/en.wikipedia.org/wiki/Surfactant. (Year: 2017).*

(Continued)

*Primary Examiner* — Kelly M Gambetta
*Assistant Examiner* — Andrés E. Behrens, Jr.
(74) *Attorney, Agent, or Firm* — Invention To Patent Services; Alex Hobson (57) ABSTRACT

A moldable green-body composite includes milling silicon nitride powder with a solvent and adding a surface modifier to the milled slurry to modify a surface of the silicon nitride particles. A polysiloxane in a solvent and a binder are also added to create a green body slurry. The solvents may be polar or non-polar solvents. A sintering aid, such as yttria-alumina, may be added to the slurry as well. A reduced density silicon nitride ceramic is made from the moldable green-body composite by molding the moldable green-body composite in a mold and curing at a curing temperature to convert the moldable green-body composite to a converted composite. The converted composite can then be sintered to form a reduced density silicon nitride ceramic that has a smooth surface finish and requires no post machining or polishing. The reduced density silicon nitride ceramic may also have very good dielectric properties.

10 Claims, 7 Drawing Sheets

Related U.S. Application Data (60) Provisional application No. 62/533,771, filed on Jul. 18, 2017.

(51) Int. Cl.
*C04B 35/626* (2006.01)
*C04B 35/645* (2006.01)

(52) U.S. Cl.
CPC .............. *C04B 2235/6567* (2013.01); *C04B 2235/6582* (2013.01)

(56) References Cited

U.S. PATENT DOCUMENTS

| | | | | |
|---|---|---|---|---|
| 4,612,297 | A * | 9/1986 | Kasai | C04B 35/584 501/96.2 |
| 4,834,928 | A * | 5/1989 | Su | C04B 35/584 501/12 |
| 5,077,134 | A | 12/1991 | Leibfried., Sr. | |
| 5,080,844 | A * | 1/1992 | Su | C04B 35/589 501/96.2 |
| 5,124,423 | A | 6/1992 | Leibfried | |
| 5,167,887 | A * | 12/1992 | Su | C04B 35/589 501/96.2 |
| 5,340,644 | A | 8/1994 | Badcock et al. | |
| 5,391,678 | A | 2/1995 | Bard et al. | |
| 5,451,637 | A | 9/1995 | Leibfried | |
| 5,466,512 | A | 11/1995 | Badcock et al. | |
| 5,612,399 | A | 3/1997 | Beackley et al. | |
| 5,632,925 | A | 5/1997 | Moulton et al. | |
| 5,641,817 | A | 6/1997 | Aghajanian et al. | |
| 5,696,041 | A * | 12/1997 | Collins | C04B 35/486 501/97.1 |
| 5,750,449 | A * | 5/1998 | Niihara | C04B 38/00 501/89 |
| 6,133,180 | A * | 10/2000 | Miyake | C04B 35/632 501/96.1 |
| 6,149,559 | A | 11/2000 | Zank | |
| 6,623,864 | B1 | 9/2003 | Sweet et al. | |
| 7,098,275 | B2 | 8/2006 | Inglefield | |
| 7,157,115 | B2 * | 1/2007 | Pickrell | C08J 9/0004 428/305.5 |
| 8,021,449 | B2 * | 9/2011 | Seth | C09K 3/1436 51/293 |
| 8,349,460 | B2 | 1/2013 | Paul | |
| 8,680,167 | B2 | 3/2014 | Agarwal et al. | |
| 2008/0128961 | A1 | 6/2008 | Slenes et al. | |
| 2010/0326699 | A1 | 12/2010 | Greyling | |
| 2015/0290834 | A1 * | 10/2015 | Klotz | C04B 35/583 429/491 |

OTHER PUBLICATIONS

Park,JongChul,etal."EffectofSilicaCoatingontheThermalStabilityof TantalumBasedNitridesPigments." KeyEngineeringMaterials,vol. 434-435,2010,pp. 134-137.,doi: 10.4028Avww.scientific.net/kem.434-435.134. (Year: 2010).*

"Silicone." Wikipedia,May 23, 2017,web.archive.orgfweb/ 20170523142224/en.wikipedia.org/wiki/Silicone. (Year: 2017).*

Varga,Imre,etal."EffectofPHofAqueousCeramicSuspensionsonColl oidalStabilityandPrecisionofAnalyticalMeasurementsUsingSlurryN ebulizationInductivelyCoupledPlasmaAtomicEmissionSpectro metry." SpectrochimicaActaPartB:AtomicSpectroscopy,vol. 51,No. 2,1996,pp. 253-259 (Year: 1996).*

Laine, RichardM.,etal. "SyntheticRoutestoOligosilazanesandPolysilazanes." ACSSymposi umSeriesInorganicandOrganometallicPolymers,1988,p. 124-142. ,doi: 10.1021/bk-1988-0360.ch010. (Year: 1988).*

Effect of pH of aqueous ceramic suspensions on colloidal stability and precision of analytical measurements using slurry nebulization inductively coupled plasma atomic emission spectrometry, Imre Varga Department of inorganic and Analytical Chemistry, L. EotviJs University, P.O. Box 32, H-1518 Budapest 112. Hungarv Department (~f Colloid Chemistry, L. Eotvos University, P.O. Box 32, H-1518 Budapest I 12, Hungary Mar. 13, 1995.

Effect of Silica Coating on the Thermal Stability of Tantalum Based Nitrides Pigments, Jong-Chui Park, Jae-Hwan Pee, YooJin Kim and Woo-Seek Cho, Key Engineering Materials ISSN: 1662-9795, vols. 434-435, pp. 134-137, Mar. 29, 2010.

* cited by examiner

MOLDABLE SILICON NITRIDE GREEN-BODY COMPOSITE AND REDUCED DENSITY SILICON NITRIDE CERAMIC PROCESS

CROSS REFERENCE TO RELATED APPLICATIONS

This application is a continuation in part of U.S. application Ser. No. 16/039,313 filed on Jul. 18, 2018 and which claims the benefit of priority to U.S. provisional patent application No. 62/533,771, filed on Jul. 18, 2017; the entirety of which is hereby incorporated by reference herein.

BACKGROUND OF THE INVENTION

Background

Silicon nitride is a ceramic with, among other things, interesting microstructural characteristics, desirable electrical properties for radio frequency (RF) applications (i.e., radomes, windows and conformal antenna parts) and high temperature capability. While silicon nitride is most commonly used in the structural ceramic market as bearings and other structural parts, it has long been considered a desirable material for elevated temperature RF applications. This is due to its strength at high temperature and potential for very good dielectric properties.

Today there are two common routes to forming bulk silicon nitride parts. The first is by sintering silicon nitride powder, with or without applied pressure (by far the majority of structural parts are made by pressure-applied sintering, either hot pressing or hot isostatic pressing) and the other is by the reaction bonding method.

In the sintering process, commonly known as sintered silicon nitride or sometimes hot pressed silicon nitride, a powder compact is formed and then sintered at high temperature. Usually, a large amount of sintering aids is used to aid in achieving high densities. Because of this, the dielectric properties are not as desirable as could be.

In the reaction bonding process, known as reaction bonded silicon nitride (RBSN), a powder compact of elemental silicon is reacted with nitrogen gas to form silicon nitride. While this process yields parts with good dielectric properties, the process is difficult to control and expensive. Sintered silicon nitride produces parts with relatively high density whereas RBSN produces parts with low density. As a result, the strength of a low density RBSN part is lower than that of sintered silicon nitride.

In both processes, silicon nitride parts are formed oversize, sintered or nitrided, and then post sinter machined to meet final part geometry and tolerances. This is due to the fact that tolerances, typically, cannot be held in these processes and, in addition, an undesirable reaction layer is formed on the surface of the parts which needs to be removed post sinter.

Ceramics, including silicon nitride, are difficult to machine as they are very hard and as a result material removal rates are very slow. In addition, silicon nitride is prone to cracking and chipping during machining. In many situations, a sintered silicon nitride ceramic part requires extensive post-sinter machining to meet design tolerances and surface roughness specifications. The cost of post surfacing the sintered molded part can easily exceed any of the prior manufacturing cost.

A moldable green-body composite with rheology that allows it to flow well, typically requires an amount of binder, the component that enables flow in the ceramic slurry, that is equal to 30 to 50 vol percent of the overall composition. With clever use of particle size distribution, this amount can be reduced to nearly 10 volume percent. The amount of effort to achieve this, however, is not feasible from a practical standpoint. In the end, with a traditional binder, it needs to be removed from the composite before final densification of the part. For parts with large cross-sections, even 10 vol. percent represents a difficult de-binding (burn-out) challenge. In addition to the difficulties that a large amount of binder presents during processing, the large amount of binder can negatively impact the strength and density of the sintered part and it also can act as a contaminate that degrades the dielectric properties.

During densification or sintering, ceramics, including silicon nitride parts, shrink substantially during the sintering process making it difficult to maintain important dimensional aspects that can be critical for an application. In particular, bolt or fastener locations or spacing therebetween, and thread pitch and geometry of a threaded hole have critical tolerances that are difficult to achieve with large and variable shrinking characteristics.

SUMMARY OF THE INVENTION

The two most desirable attributes of this material/process is that parts can be made with minimal or no post-sinter machining and the electrical properties for RF applications are superior to other silicon nitride materials. These properties include: dielectric constant, loss and the dependence of these with temperature.

The invention is directed to a moldable green-body composite and a reduced density ceramic composite. In an exemplary embodiment, the moldable green-body composite comprises silicon nitride that is configured to flow into molds having small aspect elements and upon sintering produces a reduced density ceramic that has a high strength to density ratio. In addition, the sintered silicon nitride ceramic part has minimal and predictable shrinkage and therefore allows molding of parts with small aspect elements including threaded fastener holes. Furthermore, the silicon nitride ceramic parts produced from the moldable silicon nitride composite, described herein, has a smooth surface finish eliminating or greatly reducing the need for post polishing or grinding. The ceramic parts produced from the moldable green-body composites may also have a low dielectric constant, low loss and minimal variation of these with temperature, in part due to the low density as well as the sintering aid chemistry involved.

An exemplary moldable green-body composite is made by ball milling a ceramic, such as silicon nitride, down to a small average particle size, such as no more than about 20 µm, preferably no more than about 10 µm, more preferably no more than about 5 µm, more preferably no more than about 2 µm, and even more preferably no more than about 1 µm, and any range between and including the particle sizes provided. The silicon nitride particle size must be small enough to enable flow of the moldable green-body composite into the mold and small cavities within the mold. It is also important that the particles have a suitable range of particle sizes to enable effective tight packing of the silicon nitride particles. Tight packing of the particles minimizes the interstitial space between particles which in turn minimizes the amount of binder required to create flow, minimizes the size of the porosity in the sintered body and increases the sinterability. The ceramic powder may be milled, such as in a ball mill with a solvent carrier to reduce the particle size and achieve a desirable particle size distribution. A desirable distribution may be non-gaussian and have a small average and a trailing larger particle size concentration. The milling and/or mixing processes may be performed at an elevated temperature and care may be taken to keep the elevated temperature below a temperature that would initiate any chemical reactions, such as cross-linking of the binder. The solvent, ceramic powder and other components may be included during the milling process, such as sintering aids, dispersants, surfactants and any other surface chemistry modifiers. A sintering aid may be an oxide ceramic, or combination of oxide ceramics, such as those selected from the group comprising, $Y_2O_3$, $Al_2O_3$, MgO, BeO, silica and lanthana. A surface modifier, such as silane or a silane containing compound, may be added to modify the surface of the ceramic particles to promote bonding of the binder with the ceramic particles. The milling process produces a mill slurry and other components may be added to the mill slurry including an anti-agglomerate and a binder, such as polysiloxane and polysilazanes. An exemplary binder is a silicon containing polymer. The solvent may be removed to produce a moldable green-body composite. The solvent may be removed in a rotary evaporator or slurry mixing kettle while the slurry is being mixed. The solvent may be reduced down to less than 5% by weight and more preferably less than 2% by weight. The green-body composite can then be further dried, such as in a convection oven, to further reduce any solvent concentration and then ground down to a powder. The moldable green-body composite may be ground down to a size to allow uniform handling and heating during subsequent molding operations. The average particle size of a moldable green-body composite may be less than about 5 μm, less than about 2 μm, less than about 1 μm and any range between and including the particle sizes provided.

The moldable green-body composite may then be placed into a mold with pressure applied directly to the mold cavity as in compression molding or with pressure applied to the mold cavity material via an external source as in injection or transfer molding. The molded part is then thermally cured to produce a molded green body. The strength of the molded green-body part has sufficient strength to be able to handle, measure and machine (~5-10 ksi flexure).

The molded green body may then be converted, wherein the mold is heated to a conversion temperature for an effective conversion time to produce a converted composite wherein the majority of the binder is converted to silicon nitride. The converting step may be performed in a reactive environment to allow the binder to effectively react, convert to silicon nitride and bind the ceramic particles together. The reactive environment may include reactive gas mixture of hydrogen and/or ammonia with nitrogen, for example. The hydrogen may be included in the reactive gas mixture at a low and safe concentration of no more than about 8% or no more than about 5%. Likewise, the ammonia may be included in the reactive gas mixture at a concentration of no more than about 5% or no more than about 1%. The reactive gasses may promote conversion of the binder to silicon nitride. In addition, the moldable green-body composite may be converted under a conversion temperature profile to minimize thermal stress and the likelihood of crack and other defect formation. The green body part may be heated from about room temperature to a conversion temperature in a ramp profile with one or more isothermal conditions along the ramp. The strength of the converted-body part is sufficient to allow handling, measuring and light machining having about a 1 ksi flexure strength. This conversion process produces a converted composite that is then sintered to produce a molded ceramic part.

The converted composite may be sintered in a packed powder bed at a sintering temperature for a sintering time. The packed powder bed is in contact with the converted composite during the sintering step to produce a reduced density ceramic part. The packed powder bed may comprise, silicon nitride, boron nitride, alumina, silica; and barium carbonate. The sintered strength of the part is greatly increased up to about 175 ksi flexure strength.

In an exemplary embodiment, a moldable green-body composite is produced by combining silicon nitride with a solvent, such as acetone, and a sintering aid to produce a first slurry. The sintering aid may be alumina-yttria. The initial silicon nitride powder may be screened through a sieve, such as a 325 mesh, which allows 44 μm or smaller particles to pass through, prior to milling. The first slurry may be ground with 0.250 in alumina grinding media. A surface modifier, such as silane, and an anti-agglomerate may be added to the mill slurry with additional solvent, or may be pre-dissolved or mixed with a solvent before adding. In addition, a binder, such as a polysiloxane, may be added and may be pre-dissolved and/or mixed with a solvent before adding. The solvent for the binder may dissolve the binder. The binder may be a mixture of two or more binders. In a preferred embodiment, two different silicone resins are mixed to form a binder such as SILRES® REN 80 and SILRES® MK Powder, available from WAKER Chemie AG. REN 80 is a methyl phenyl group containing silicone resin and MK Powder is a methyl silicone resin. In an exemplary embodiment, the binder and a solvent are combined to produce a pre-dissolved binder having a binder concentration of about 25 to 50%. The binder acts to hold the ceramic particles together after the converting step to create a converted composite. The converted composite is free-standing with fairly high strength and is then sintered to from a ceramic part.

The conversion and sintering steps of the moldable green-body composite may be conducted in a mold or in a form and a press. The green-body composite may be poured or otherwise configured into a mold and then heated to a conversion temperature for an effective amount of conversion time to produce a converted composite. In one embodiment, the composite is configured into a form, heated and pressed, such as in a Wabash press under a high load, or molding pressure. In another embodiment, the moldable green-body composite may be placed in a mold and heated within the mold to produce a converted composite. The time and temperatures for curing, converting and sintering may depend on the part geometry such as size and thickness. Large parts that have thick sections may require longer times at temperature than small and thinner parts.

In an exemplary embodiment, the moldable green-body composite comprises a surface modifier, such as silane, that may act to modify the surface of the ceramic particles for coupling with a binder, such as polysiloxane. The surface modifier modifies the surface of the silicon nitride particles to make them more hydrophilic. In an exemplary embodiment, a surface modifier is added to a first slurry of silicon nitride particles and a solvent, such as acetone, to produce a second slurry.

An anti-agglomerate, such as stearic acid, is added to enhance particle dispersion and to create a dispersed slurry. An anti-agglomerate may be a dispersant, surfactant or a steric hinderance agent or compound. A steric hinderance compound may act to prevent particles from contacting each other and agglomerating. It is important to have dispersed particles, otherwise, agglomerated particles may lead to poor part uniformity and a weak part that is prone to cracking. A binder comprising polysiloxane is mixed with a solvent and then added to the dispersed mill slurry to produce a green body slurry. A catalyst may be included to promote reaction and cross-linking of the binder. The solvents are substantially removed from this green body slurry to produce an exemplary moldable silicon nitride composite. The moldable silicon nitride composite, or moldable green-body composite, may then be post ground to a particle size that will allow the moldable silicon nitride composite to easily flow into molds. The moldable green-body composite may be ground or otherwise reduced in size to have an average particle size of about 10 µm or less, about 5 µm or less, and the like.

An exemplary moldable green-body composite is a solid at room temperature and will flow when heated. An exemplary green-body composite comprises silicon nitride particles that have an average particle size and particle size distribution that enables effective flow of the composition when heated, such that the exemplary green-body resin can be injection molded into cavities. An exemplary green-body composite will have a flow length of at least about 5 in., and preferably at least about 10 in and even more preferably at least about 20 in, and any range between and including the flow lengths provided, under a modified version of ASTM D 3123, Standard Test Method for Spiral Flow of Low-Pressure Thermosetting Molding Compounds to account for the molding conditions including, time, temperature and pressure that give good results for this material. The entirety of ASTM D 3123-09(2017), Standard Test Method for Spiral Flow of Low-Pressure Thermosetting Molding Compounds is hereby incorporated by reference herein. This unique flow characteristic of the green-body resin, enables the resin to be molded into parts that can be converted and sintered into a low density silicon nitride ceramic. The components of an exemplary green-body resin may include, but are not limited to, silicon nitride, a sintering aid, a surface modifier, a binder and an anti-agglomerate. The silicon nitride may be included in a concentration of at least about 60% by weight, at least about 75% by weight, at least about 90%, or no more than about 95% by weight and any range between and including the concentrations provided. If the silicon nitride is not included in a high enough concentration, the resulting silicon nitride ceramic will be weak and prone to cracking during subsequent processing and if it is too high, the green-body resin may not flow or be injection moldable. In addition, the particle size of the silicon nitride is important for injection molding flow characteristics and also for the strength of the silicon nitride ceramic. The average particle size is preferably less than 5 um, and more preferably less than about 2 um and even more preferably about 1 um or less. In addition, the particle size distribution is important to provide tight packing of the particles to improve flow characteristics as well as enhance the sintering process. The binder may be included in a concentration of at least about 5% by weight, at least about 10% by weight, at least about 15%, or no more than about 25% by weight, or no more than about 20% and any range between and including the concentrations provided. The sintering aid may be included in a concentration of no more than 8% by weight, no more than 4% by weight, or no more than about 3.5% by weight, or at least about 1% by weight, of the green-body resin, and any range between and including the values provided. The surface modifier may be included in a concentration of about 5% or less, about 3% or less, or about 2% or less, or at least 0.3% by weight of the green-body resin and any range between and including the concentrations provided. The anti-agglomerate may be added in a concentration of about 1% or less by weight, about 0.5% or less by weight of the green-body resin, or about 0.25% or more by weight about and any range between and including the concentration values provided.

In an exemplary embodiment, the dimensional changes between the green-body part and the sintered silicon nitride ceramic is no more than 10%, preferably no more than 5%, and even more preferably no more than 2%, etc. In addition, the dimensional changes may be uniform over substantially the entire part. These small dimensional changes enable molds to more closely represent the final dimensions of the ceramic part and the uniformity of these dimensional changes, such as shrinkage between the green-body part and the ceramic part, enable oversizing of the mold including fastener locations, such as apertures that then shrink to a desired dimension.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
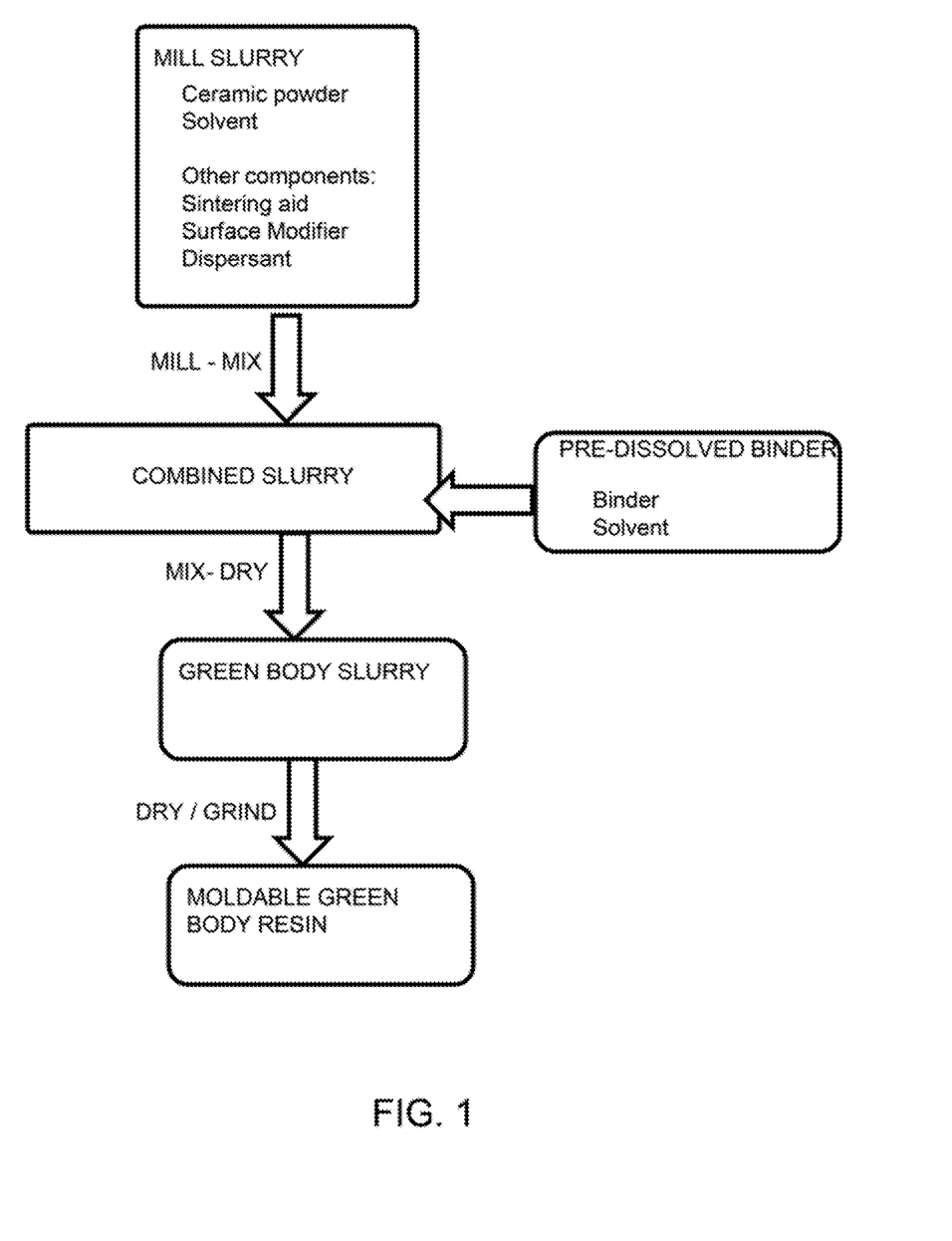
FIG. 1 shows a preferred process diagram for making a moldable green-body composite.

As shown in FIG. 1, a moldable green-body resin is produced by making a mill slurry that combines a ceramic powder with a solvent. Other components may be added and the ceramic powder is milled to produce a ceramic powder having a reduced particle size. Other components that may be added to the mill slurry include sintering aids, surface modifier and anti-agglomerates. A binder is mixed with a solvent to pre-dissolve the binder, which is added to the mill slurry to produce a combined slurry. The combined slurry is mixed and dried to produce a green body slurry that is further dried and ground to produce a moldable green-body composite.

Figure 2:
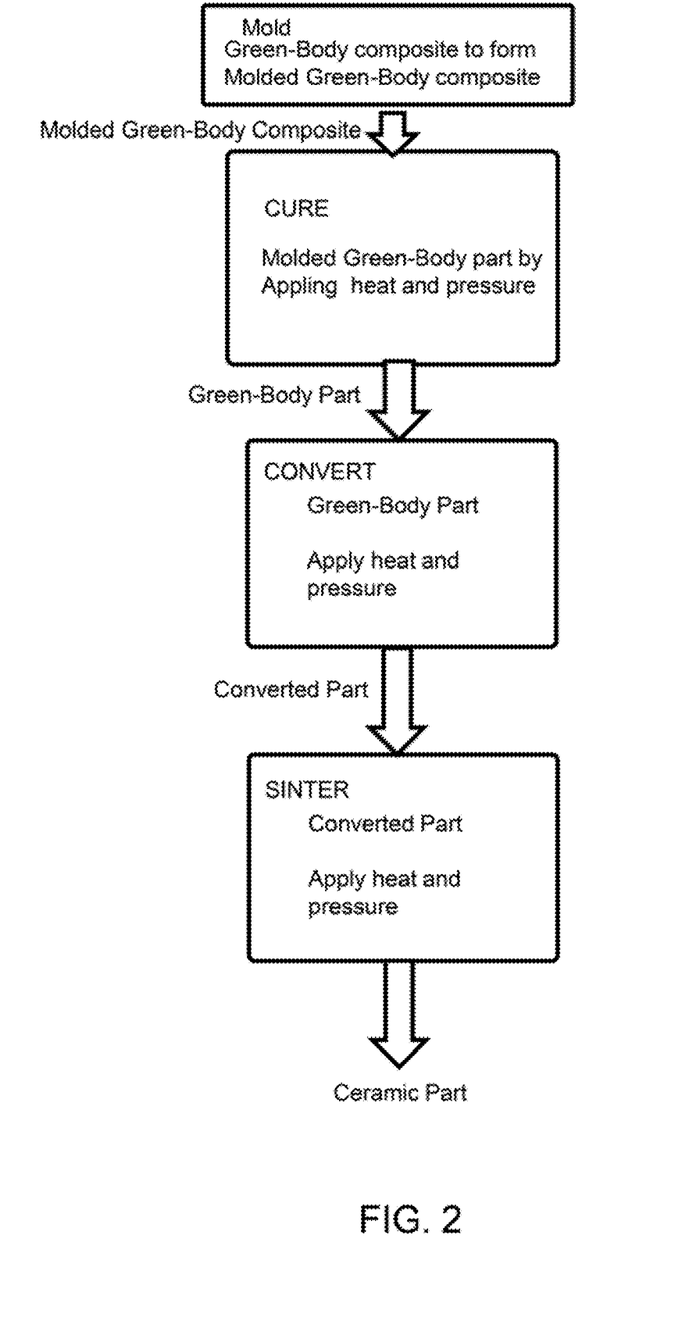
FIG. 2 shows a preferred process diagram for making a molded ceramic part from a moldable green-body composite.

As shown in FIG. 2, a green-body composite or resin is molded into a molded green-body composite and then cured by the application of heat and pressure to produce a green body part. The green body part is then converted by the application of heat to produce a converted part. The converted part is then sintered by the application of heat to make a ceramic part from a moldable green-body resin. An exemplary moldable green-body resin is molded in a mold at a molding temperature and molding pressure to form a molded part, the molding pressure may be at least about 2000 psi or about 2500 psi or more or about 3000 psi or more. An exemplary molding temperature is less than about 120° C. An exemplary step of curing the green body is conducted at an effective temperature of at least 200° C. and time of at least 5 minutes or at least 10 minutes to cross-linking the binder. The time will depend on the size of the part. An exemplary converting temperature schedule ends in a maximum temperature of at least about 700° C. and a soak time is at least one hour but may be at least 800° C. or about 900° C. for a longer soak time, such as at least 4 hours, or at least 6 hours, or at least 8 hours. An exemplary reactive environment of the converting step includes introduction of a reactive gas comprising nitrogen, hydrogen and ammonia. An exemplary sintering temperature is no more than 1650° C.

Figure 3:
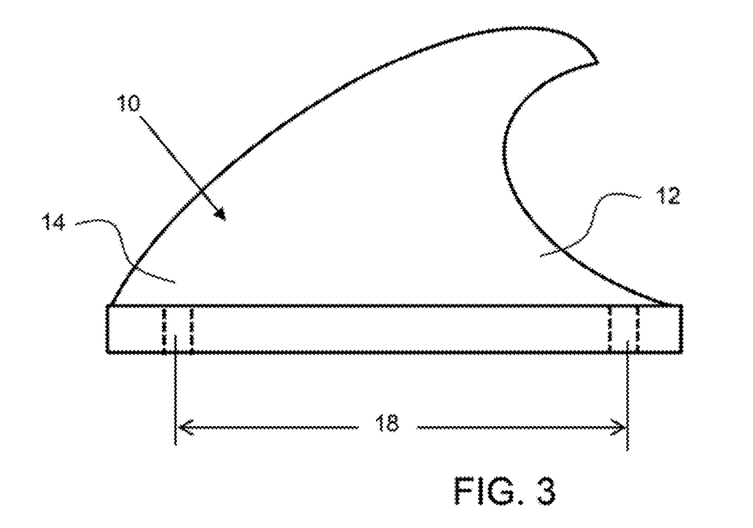
FIG. 3 shows a side view of a cured green body.
Figure 4:
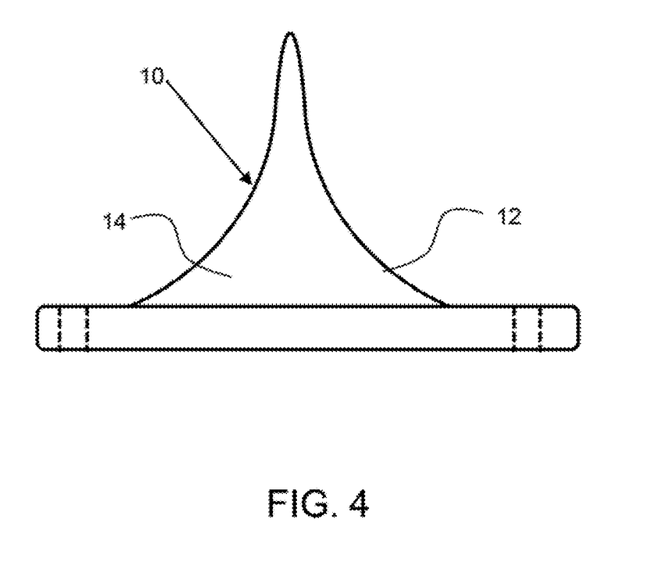
FIG. 4 shows a front view of a cured green body.

As shown in FIGS. 3 and 4, a cured green body 10 comprises ceramic particles 12 that are retained by a binder 14. The space between fastener holes is shown as 18.

Figure 5:
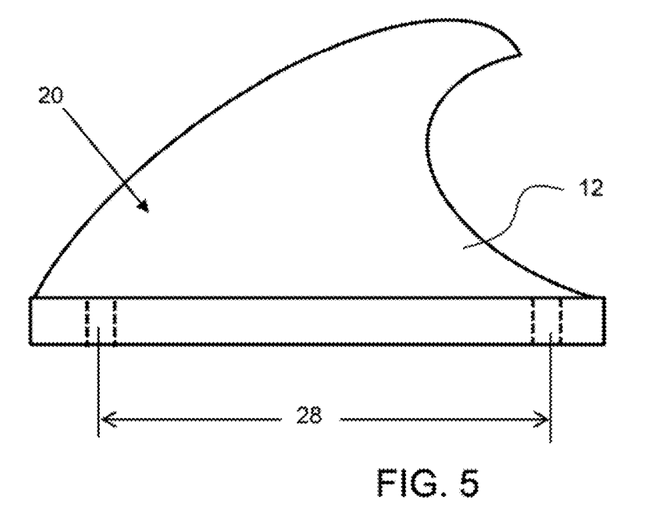
FIG. 5 shows a side view of a converted part.
Figure 6:
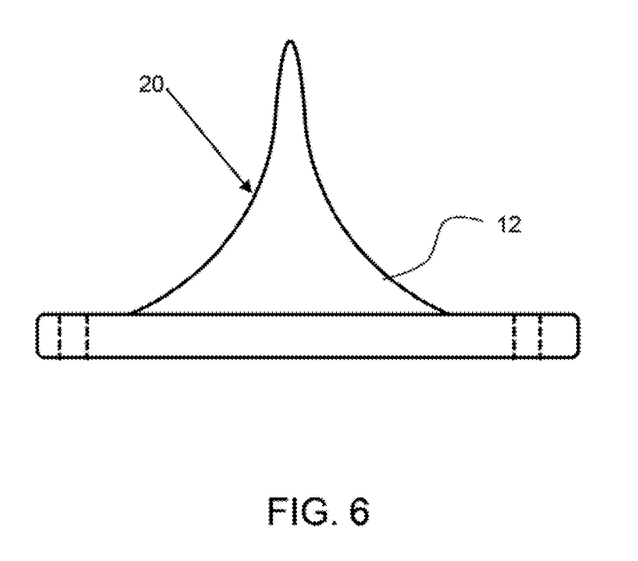
FIG. 6 shows a front view of a converted part.

As shown in FIGS. 5 and 6, a converted part 20 comprises ceramic particles 12. The space between fastener holes is shown as 28.

Figure 7:
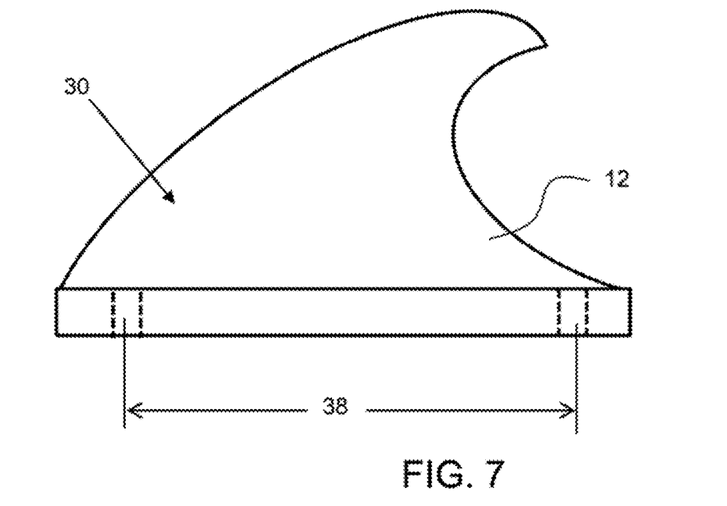
FIG. 7 shows a side view of a molded ceramic part.
Figure 8:
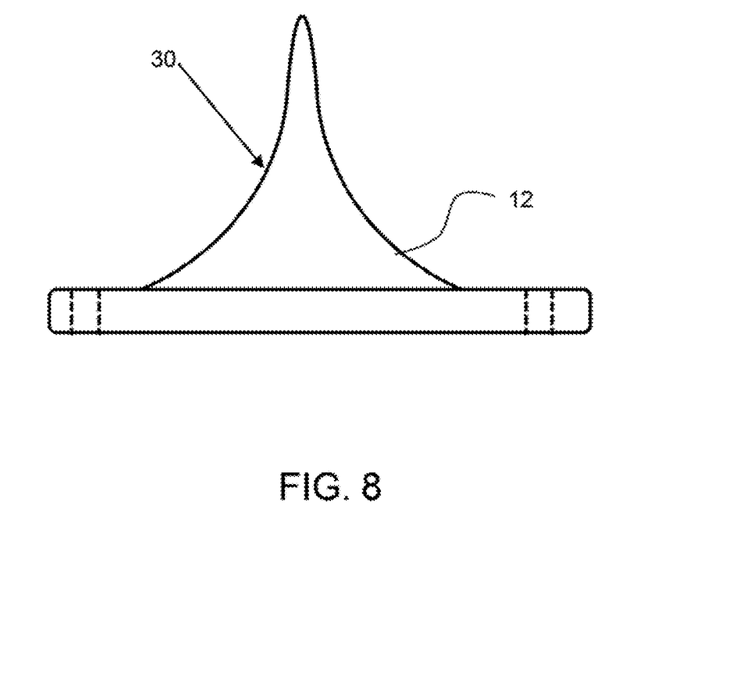
FIG. 8 shows a front view of a molded ceramic part.

As shown in FIGS. 7 and 8, a molded ceramic part 30 comprises ceramic particles 12. The space between fastener holes is shown as 38. The space between fastener holes may have less than 10% reduction from the converted green body and the molded ceramic part.

Figure 9:
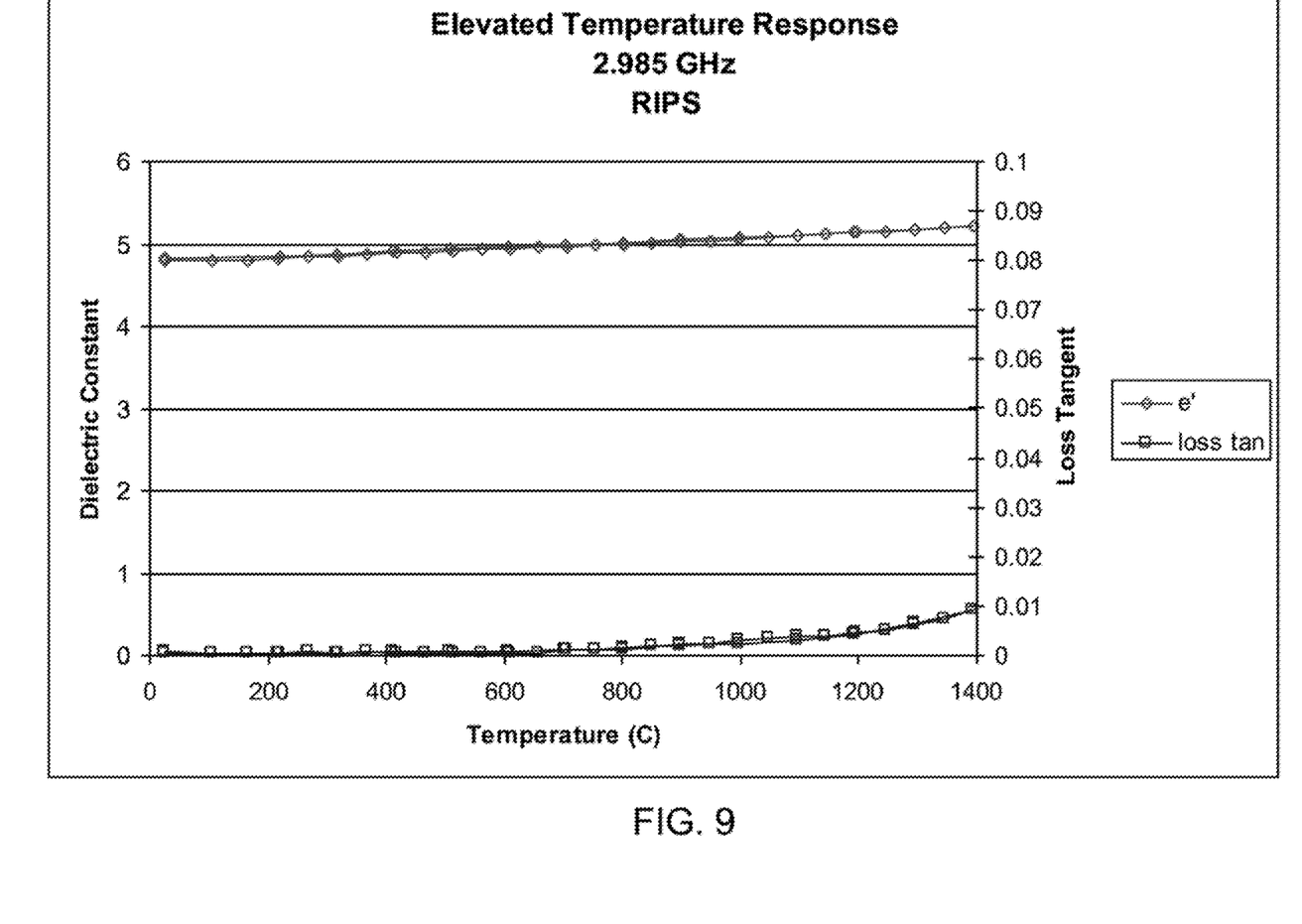
FIG. 9 shows a graph of the Elevated Temperature Response for a silicon nitride ceramic made according to the present invention.

As shown in FIG. 9, an exemplary silicon nitride ceramic made according to this invention from a moldable green-body composite has very good dielectric properties. The parts tested here have a density of 75% of theoretical.

Figure 10:
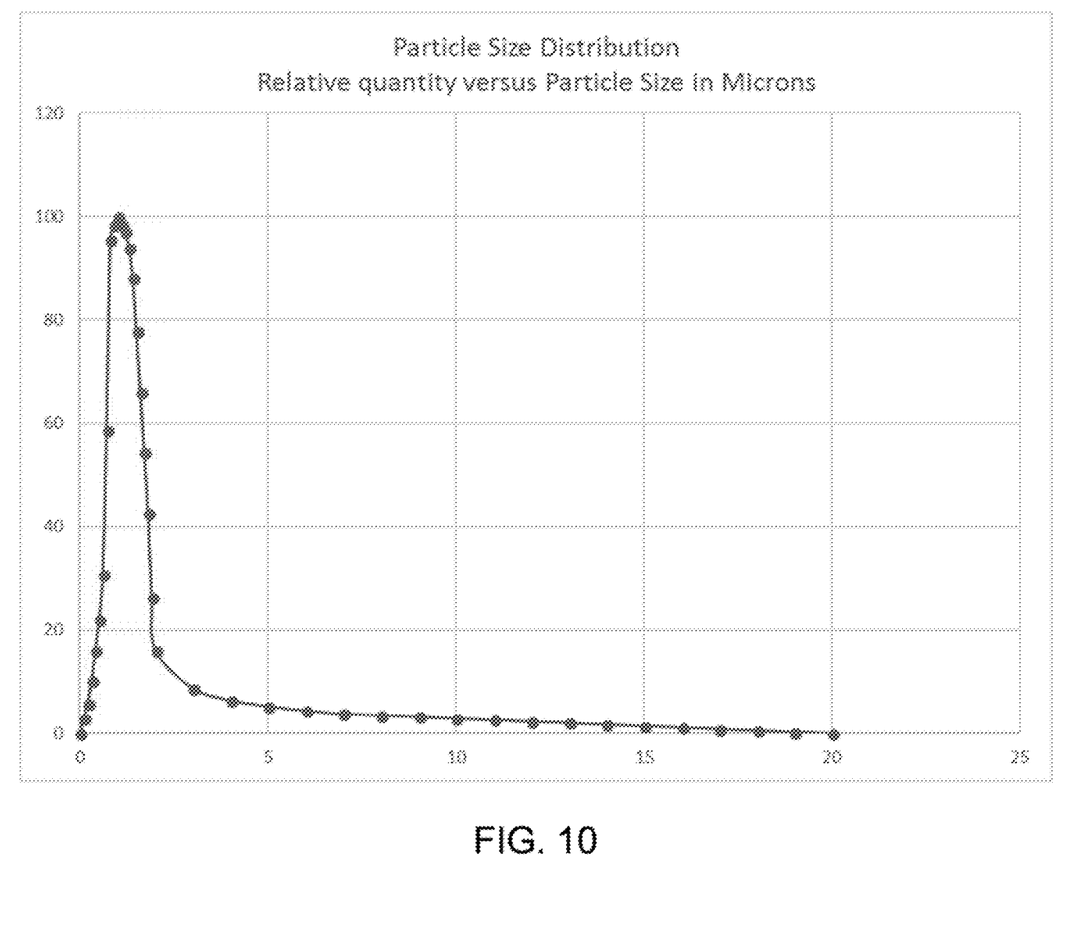
FIG. 10, shows a graph of silicon nitride particle size distribution for the milled ceramic slurry.

FIG. 10, shows a graph of silicon nitride particle size distribution for the milled ceramic slurry. The silicon nitride may have an average particle size of about 0.5 to 2 microns with a preferred particle size of about one micron with a quantity of larger particles to enhance packing. As shown, a quantity of larger particles trails off from the smaller particle sizes.

EXAMPLE

An exemplary moldable green-body composite was made according to the present invention with the composition as described in Table 1. The concentration of the silicon nitride was about 82% by weight. The concentration of the binder was about 15% by weight and the concentration of surface modifier, methyltriethoxysilane, (MTES) of about 1% by weight. Anti-agglomeration agent, stearic acid is included in a concentration of about 0.18% by weight. The sintering aids are include in a combined concentration of about 2% by weight.

TABLE 1

| Component | Mass (g) | % of Total |
| --- | --- | --- |
| $Si_3N_4$ | 300 | 82 |
| $Al_2O_3$ | 3.2 | 0.88 |
| $Y_2O_3$ | 4.3 | 1.18 |
| Binder | 54 | 14.77 |
| MTES | 3 | 0.82 |
| Stearic acid | 1.2 | 0.33 |

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A process for preparing a reduced density silicon nitride ceramic comprising the steps of: a) preparing a moldable green-body composite comprising:
   i) providing silicon nitride powder;
   ii) providing a surface modifier;
   iii) providing a binder comprising silicon containing polymer; wherein the silicon containing polymer comprises polysiloxane or polysilazanes
   iv) providing an anti-agglomerate;
   v) providing a sintering aid;
   vi) milling the silicon nitride powder and sintering aid with a first solvent to create a mill slurry of silicon nitride particles and milling said mill slurry to produce silicon nitride particles having a first average particle size of no more than 5 pm;
   vii) adding the surface modifier to the mill slurry and mixing at an elevated temperature to chemically modify a surface of the silicon nitride particles;
   viii) adding the anti-agglomerate to the mill slurry and mixing at a first temperature to create a dispersed slurry having dispersed silicon nitride particles;

ix) combining the binder and a second solvent to produce a pre-dissolved binder having 25 to 50 volume percent binder;

x) adding the pre-dissolved binder to the dispersed slurry and mixing at a second temperature that is effectively low to prevent curing of the binder, to create a green body slurry; wherein the second temperature is below 60° C.

xi) removing the first and second solvents under a vacuum until the green body slurry comprises no more than about 2% by weight solvent; thereby producing a moldable green-body composite, having a binder concentration of between 30% and 50% by volume;

b) molding the moldable green-body composite in a mold at a molding temperature and molding pressure to form a molded part;

c) curing the molded part by heating said molded part at a curing temperature for an effective curing time to create a green body part;

d) converting the green body part by heating the green body part in a reactive environment under a converting temperature profile to produce a converted composite; and e) sintering the converted composite at a sintering temperature in sintering atmosphere and a packed powder bed for a sintering time; wherein the packed powder bed is in contact with the converted composite during the sintering step to produce said reduced density silicon nitride ceramic.

2. The process for preparing a reduced density silicon nitride ceramic of claim 1, wherein the packed powder bed comprises:

a) silicon nitride; and
b) boron nitride.

3. The process for preparing a reduced density silicon nitride ceramic of claim 1, wherein the molding temperature is less than about 120° C.

4. The process for preparing a reduced density silicon nitride ceramic of claim 3, wherein the molding pressure is at least about 2000 psi.

5. The process for preparing a reduced density silicon nitride ceramic of claim 1, wherein the step of curing the green body is conducted at an effective temperature of at least 200° C. and time of at least 5 minutes to cross-linking the binder.

6. The process for preparing a reduced density silicon nitride ceramic of claim 1, wherein the converting temperature schedule ends in a maximum temperature of at least about 700° C. and a soak time is at least one hour.

7. The process for preparing a reduced density silicon nitride ceramic of claim 1, wherein the reactive environment of the converting step includes introduction of a reactive gas comprising nitrogen, hydrogen and ammonia.

8. The process for preparing a reduced density silicon nitride ceramic of claim 1, wherein the sintering temperature is no more than 1650° C.

9. The process for preparing a reduced density silicon nitride ceramic of claim 1, wherein the produced reduced density silicon nitride ceramic has a Ra surface roughness of no more than about 10 microns.

10. The process for preparing a reduced density silicon nitride ceramic of claim 1, wherein the produced reduced density silicon nitride ceramic has no more than 15% shrinkage from the molded green body.

* * * * *